(12) United States Patent
Gong

(10) Patent No.: US 12,379,474 B2
(45) Date of Patent: Aug. 5, 2025

(54) PARAMETER CONFIGURATION METHOD, DEVICE, AND COMPUTER-READABLE STORAGE MEDIUM

(71) Applicant: SUTENG INNOVATION TECHNOLOGY CO., LTD., Shenzhen (CN)

(72) Inventor: Changsheng Gong, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/766,630

(22) Filed: Jul. 8, 2024

(65) Prior Publication Data
US 2025/0067855 A1 Feb. 27, 2025

(30) Foreign Application Priority Data
Aug. 21, 2023 (CN) .......................... 202311048331.8

(51) Int. Cl.
*G01S 7/497* (2006.01)
(52) U.S. Cl.
CPC .................................. *G01S 7/497* (2013.01)
(58) Field of Classification Search
CPC .......... G01S 7/48; G01S 7/497; G01S 7/4802; Y02A 90/10
USPC ......................................................... 702/97
See application file for complete search history.

(56) References Cited

U.S. PATENT DOCUMENTS

2023/0333220 A1* 10/2023 Zhang ..................... G01S 17/10

FOREIGN PATENT DOCUMENTS

| CN | 116500639 A | 7/2023 |
| WO | 2022143036 A1 | 7/2022 |

OTHER PUBLICATIONS

Huang, CN116500639A, "Method For Realizing Laser Radar Data Acquisition And Management, Involves Obtaining Measured Laser Radar Measuring Data By Measuring Enterprises, And Obtaining Measured Laser Radar Measuring Data Of To-be-measured Requirement", Date Published: Jul. 28, 2023 (Year: 2023).*
Zhang et al., WO2022143036A, Time-of-Flight-Based Addressing and Ranging Method and Ranging System:, Date Published: Jul. 7, 2022 (Year: 2022).*
First Office Action issued in related Chinese Application No. 202311048331.8, mailed Sep. 23, 2023, 10 pages.

* cited by examiner

*Primary Examiner* — John H Le
(74) *Attorney, Agent, or Firm* — BAYES PLLC

(57) ABSTRACT

This application provides a parameter configuration method, device, and non-transitory computer-readable storage medium. In this method, the receiving units in the LiDAR receiving array are grouped according to a preset rule. Then, based on the detection requirements, the measurement range corresponding to each group of receiving units is set. Based on the measurement range of each group of receiving units, the storage space for each group of receiving units is set. The storage space is used to store the measurement data of each group of receiving units. Thus, the method reduces the acquisition of measurement data by some receiving units in unnecessary measurement ranges, decreases the volume of measurement data, and saves storage space.

6 Claims, 13 Drawing Sheets

200

S210 — Dividing a plurality of receiving units in a receiving array of a LiDAR into n groups of receiving units according to a preset rule S220 — Setting a measurement range of the $i^{th}$ group of receiving units, according to a detection requirement corresponding to the $i^{th}$ group of receiving units in the n groups of receiving units S230 — Setting storage space of the $i^{th}$ group of receiving units, based on the measurement range of the $i^{th}$ group of receiving units

PARAMETER CONFIGURATION METHOD, DEVICE, AND COMPUTER-READABLE STORAGE MEDIUM

CROSS-REFERENCE TO RELATED APPLICATION

The present application claims the benefit of priority to Chinese Patent Application No. 202311048331.8, filed on Aug. 21, 2023, which is hereby incorporated by reference in its entirety.

TECHNICAL FIELD

This application pertains to the technical field of LiDAR, particularly to a parameter configuration method, device, and computer-readable storage medium.

TECHNICAL BACKGROUND

LiDAR is a key part of achieving autonomous driving, with advantages such as high measurement detection requirements, fine time and space resolution, and long measurement distances. With the development of automotive autonomous driving technology, various types of LiDAR have emerged to meet the needs of different scenarios.

As autonomous driving technology advances towards high precision, the accuracy of LiDAR increases, resulting in a significant increase in the amount of detection data that needs to be stored and processed. These measurement data occupy a large amount of storage space.

SUMMARY

Embodiments of this application provide a parameter configuration method, device, and computer-readable storage medium, capable of saving storage space for a LiDAR.

In a first aspect, an embodiment of this application provides a parameter configuration method, comprising:
dividing a plurality of receiving units in a receiving array of a LiDAR into n groups of receiving units according to a preset rule, where each of the n groups of receiving units includes at least one receiving unit, and n is a positive integer greater than or equal to 1;
setting a measurement range of an $i^{th}$ group of receiving units according to a detection requirement corresponding to the $i^{th}$ group of receiving units in the n groups of receiving units, where i is a positive integer, and i is in a range of [1, n]; and
setting a storage space of the $i^{th}$ group of receiving units according to the measurement range of the $i^{th}$ group of receiving units, where the storage space is used to store measurement data of the $i^{th}$ group of receiving units.

In an embodiment, the dividing of the plurality of receiving units in the receiving array of the LiDAR into n groups of receiving units according to a preset rule includes:
according to the preset rule, dividing the plurality of receiving units into the n groups of receiving units based on a field of view range corresponding to the plurality of receiving units.

In an embodiment, the dividing of the plurality of receiving units in the receiving array of the LiDAR into n groups of receiving units according to a preset rule includes:
according to a preset rule, dividing the plurality of receiving units into the n groups of receiving units based on a row number and/or a column number of the plurality of receiving units.

In an embodiment, the setting of the measurement range of the $i^{th}$ group of receiving units according to the detection requirement corresponding to the $i^{th}$ group of receiving units in the n groups of receiving units includes:
obtaining a maximum measurement range corresponding to current measurement data of the $i^{th}$ group of receiving units and a historical measurement range corresponding to historical measurement data; and
setting the measurement range of the $i^{th}$ group of receiving units according to the maximum measurement range and the historical measurement range.

In an embodiment, the method further includes: setting a sampling rate of the $i^{th}$ group of receiving units on different segments in the measurement range, according to the detection requirement corresponding to the $i^{th}$ group of receiving units.

In an embodiment, the method further includes: selecting the measurement data of the $i^{th}$ group of receiving units according to a detection situation of the $i^{th}$ group of receiving units.

In an embodiment, the fields of view corresponding to the plurality of receiving units include horizontal and vertical detection fields of view, and the method further includes:
determining detection resolution requirements of the horizontal and vertical detection fields of view;
if the detection resolution requirement of the horizontal detection field of view is high;
grouping the plurality of receiving units according to the field of view range of the horizontal detection field of view;
adjusting the grouping of the plurality of receiving units according to the field of view range of the vertical detection field of view;
if the detection resolution requirement of the vertical detection field of view is high;
grouping the plurality of receiving units according to the field of view range of the vertical detection field of view;
adjusting the grouping of the plurality of receiving units according to the field of view range of the horizontal detection field of view.

In a second aspect, an embodiment of this application provides a parameter configuration device, comprising: a grouping module, configured to divide a plurality of receiving units in a receiving array of a LiDAR into n groups of receiving units according to a preset rule, where each of the n groups of receiving units includes at least one receiving unit, and n is a positive integer greater than or equal to 1; and a setting module, configured to set a measurement range of an $i^{th}$ group of receiving units according to a detection requirement corresponding to the $i^{th}$ group of receiving units in the n groups of receiving units, where i is a positive integer, and i is in a range of [1, n].

In a third aspect, an embodiment of this application provides a parameter configuration device, comprising: a processor and a memory; where the memory stores a computer program, which is configured to be loaded and executed by the processor to perform the method embodiments.

In a fourth aspect, an embodiment of this application provides a non-transitory computer-readable storage medium, which stores a computer program, the computer program being executed by a processor to implement the method embodiments.

By grouping the receiving units, different measurement ranges can be set for different groups of receiving units according to detection requirements, reducing unnecessary data measurements and saving storage space. In an embodiment, if the same measurement range is set for all receiving units in the LiDAR receiving array, the measurement range needs to be set relatively large to meet business requirements. For those receiving units that do not need to measure relatively far distances, a large measurement range will have unnecessary sampling data, still requiring a large storage area for these receiving units, resulting in a waste of storage space. Setting different measurement ranges for different groups of receiving units according to actual detection requirements can reduce the total amount of measurement data and save the storage space for measurement data.

BRIEF DESCRIPTION OF DRAWINGS

To more clearly illustrate the technical solutions of the embodiments of this application, the accompanying drawings required for describing the embodiments will be briefly introduced below.

DETAILED DESCRIPTION

To make the objectives, technical solutions, and advantages of the embodiments of this application clearer, the technical solutions in the embodiments of this application will be described clearly below with reference to the accompanying drawings in the embodiments of this application.

The terms "first," "second," "third," "fourth," and other similar terms in the description, claims, and drawings of this application (if present) are used to distinguish similar objects and are not necessarily used to describe specific sequences or orders. The data used in this way can be interchanged appropriately under certain circumstances to allow the embodiments described herein to be implemented in a sequence other than that illustrated or described herein. Additionally, the terms "comprise" and "include" as well as their any variations, are intended to cover non-exclusive inclusion, for example, a process, method, system, product, or device comprising a series of steps or units is not necessarily limited to those clearly listed steps or units, but may include other steps or units that are not clearly listed or inherent to these processes, methods, products, or devices.

In the description of the embodiments of this application, unless otherwise specified, "/" indicates "or," for example, A/B can mean A or B; "and/or" herein only describes an associative relationship of related objects, indicating that there may be three types of relationships, for example, A and/or B can mean: only A exists, both A and B exist, and only B exists. Additionally, in the description of the embodiments of this application, "multiple" or "plurality" refers to two or more.

The operation methods in the method embodiments of this application can also be applied to the device embodiments or system embodiments.

In embodiment of this application, unless otherwise specified and logical conflict is avoided, the terminology and/or descriptions in different embodiments are consistent and can be referenced to each other, and the technical features in different embodiments can be combined to form new embodiments based on their inherent logical relationships.

Various numerical identifiers involved in embodiment are only for distinguishing convenience. The sizes of the serial numbers of the aforementioned processes do not imply the order of execution, and the order of execution of each process should be determined by its function and intrinsic logic.

A LIDAR includes an array of emitter units and an array of receiver units. It can simultaneously acquire point cloud data from multiple angles and is widely used in fields such as autonomous driving, robotics, and drones. The LiDAR can also be referred to as array-type LiDAR, array-based LiDAR, etc.

Figure 1:
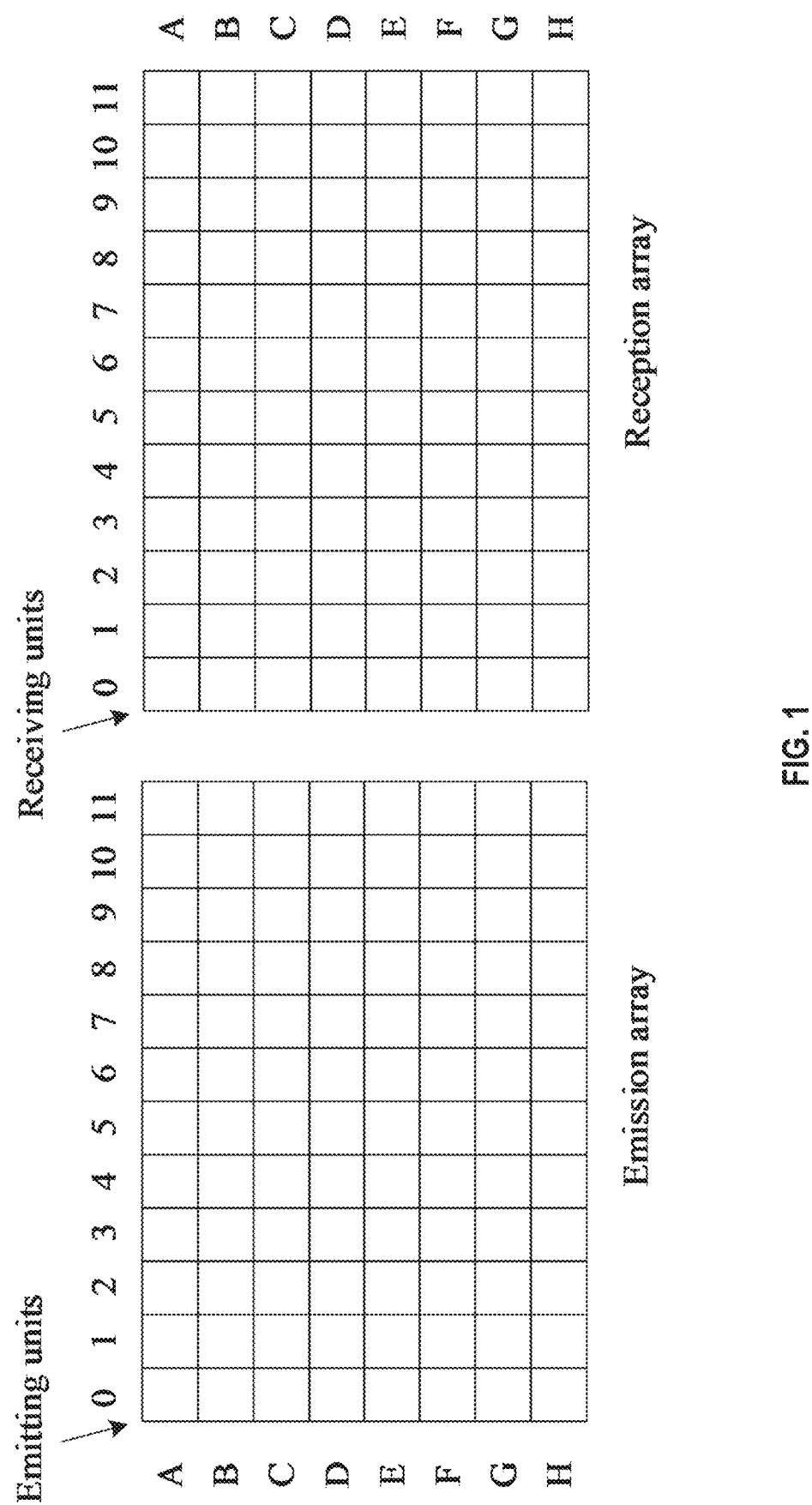
FIG. 1 is a structural schematic diagram of an emission array and a receiving array of a LiDAR provided in an embodiment.

FIG. 1 is a structural schematic diagram of an emission array and a receiving array of a LiDAR provided in an embodiment.

In an embodiment, as shown in FIG. 1, the LiDAR includes an emission array (array emitter) and a reception array (array receiver). The emission array includes multiple emitting units, and the reception array includes multiple receiving units. In an embodiment, a quantity of emitting units can be set to be the same as a quantity of receiving units, each emitting unit corresponds to one receiving unit. In an embodiment, one emitting unit corresponds to multiple receiving units, or multiple emitting units correspond to one receiving unit.

When the radar detection accuracy requirement increases, a quantity of emission and reception channels of the LiDAR also increases. Therefore, a LiDAR generally includes multiple groups of emitting units and receiving unit pairs, thereby generating a large amount of detection data. This data will occupy a large amount of storage space. In an embodiment, a LiDAR has rotating components, such as a rotary drive platform; or scanning components, such as a rotating mirror, galvanometer, or a combination of both, which is not limited herein.

In an embodiment, a parameter configuration method is provided, in which the receiving units in the LiDAR's receiving array are grouped according to a preset rule. Based on detection requirements, the measurement range corresponding to each group of receiving units is set, thereby reducing the amount of measurement data acquired by some receiving units in unnecessary measurement ranges, reducing the data volume of measurement data, and saving storage space.

Figure 2:
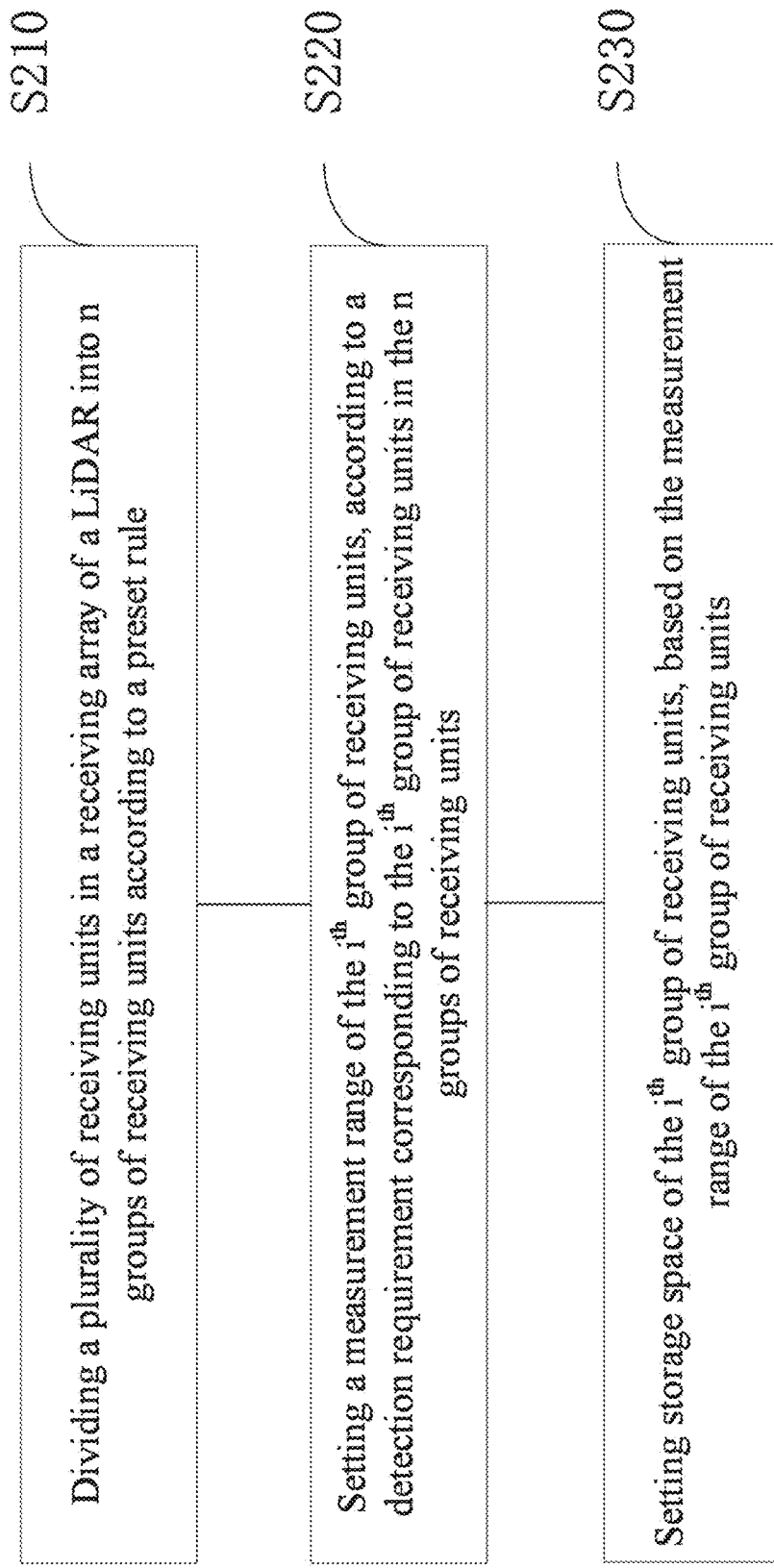
FIG. 2 is a schematic flow chart of a parameter configuration method provided in an embodiment.

FIG. 2 is a schematic flow chart of a parameter configuration method provided in an embodiment.

In an embodiment, as shown in FIG. 2, a method 200 includes the following steps:

S210: Dividing a plurality of receiving units in a receiving array of a LiDAR into n groups of receiving units according to a preset rule.

In an embodiment, the plurality of receiving units in the receiving array of the LiDAR are divided into n groups according to a preset rule, where each group of receiving units includes at least one receiving unit, n is a positive integer greater than or equal to 1.

Receiving units can be avalanche photodiodes (APDs), single-photon avalanche diodes (SPADs), or silicon photomultipliers (SIPMs).

In an embodiment, each receiving unit has a corresponding emitting unit, and thus dividing the receiving units into n groups can also be dividing the emitting and receiving unit pairs into n groups. The emitting and receiving unit pair here refers to a receiving unit and one or more corresponding emitting units.

In an embodiment, the plurality of emitting units in the LiDAR's emission array can be divided into n groups according to a preset rule, where each group of emitting units includes at least one emitting unit. The receiving units can be grouped, the emitting and receiving unit pairs can be grouped, or the emitting units can be grouped.

An embodiment is disclosed to illustrate possible implementations of grouping multiple receiving units according to preset rules.

In an embodiment, the preset rule can be to group the multiple receiving units based on their physical arrangement. In an embodiment, grouping the multiple receiving units based on preset rules can be to divide the multiple receiving units into n groups based on their row numbers and/or column numbers.

Figure 3:
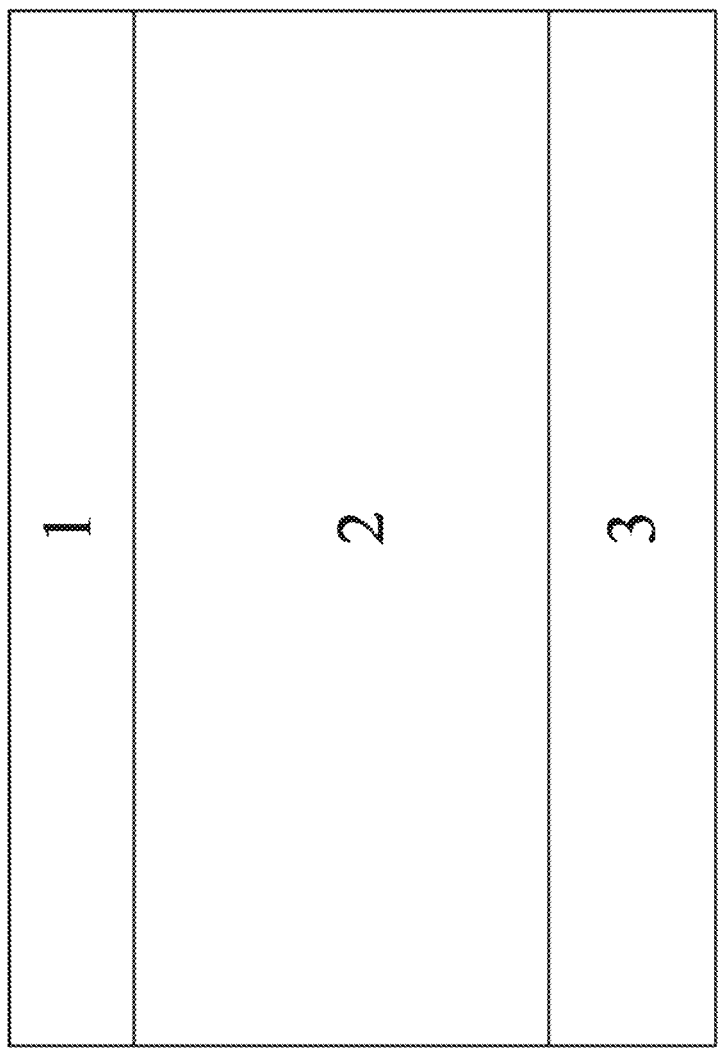
FIG. 3 is a schematic diagram of grouping receiving units provided in an embodiment.

FIG. 3 is a schematic diagram of grouping receiving units provided in an embodiment.

In an embodiment, the receiving units can be grouped according to their row numbers. In an embodiment, a receiving array of the LiDAR includes 96 receiving units in total, arranged in an 8×12 array, with row numbers labeled A~H and column numbers labeled 0~11. Each receiving unit can be uniquely identified by its row and column numbers. For example, the receiving unit in the first row and first column can be identified as A0, and the receiving unit in the second row and second column can be identified as B1. According to the preset rule, the 96 receiving units can be grouped based on row numbers, as shown in FIG. 3. In a grouping result shown in FIG. 3, the 96 receiving units are divided into 3 groups based on their row numbers: the receiving units in rows A and B are grouped as the first group, the receiving units in rows C~F are grouped as the second group, and the receiving units in rows G and H are grouped as the third group.

Figure 4:
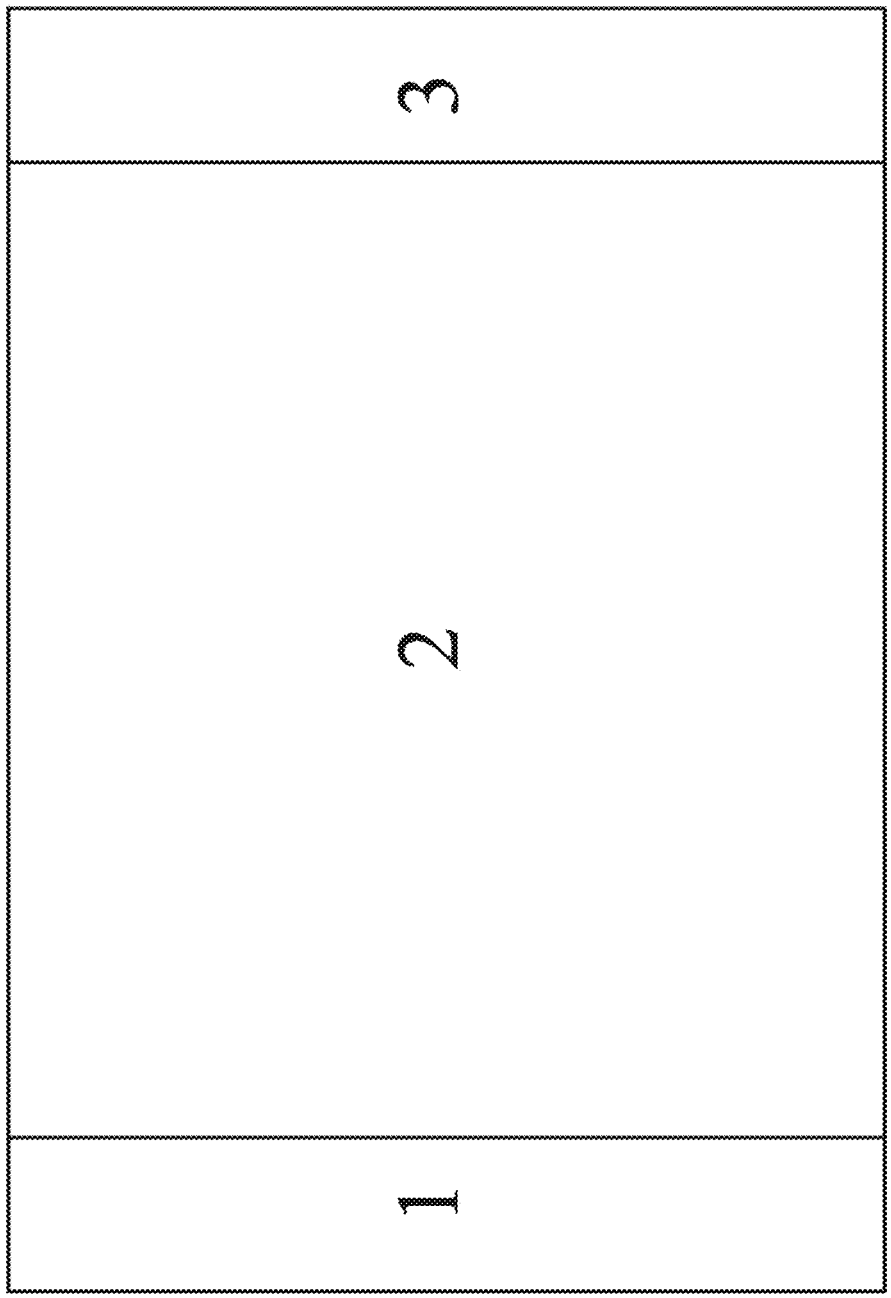
FIG. 4 is another schematic diagram of grouping receiving units provided in an embodiment.

FIG. 4 is another schematic diagram of grouping receiving units provided in an embodiment.

In an embodiment, grouping the receiving units according to their column numbers is disclosed. Taking the receiving array shown in FIG. 1 as an example: according to the preset rule, the 96 receiving units in the receiving array can be grouped based on column numbers, as shown in FIG. 4. In the grouping result shown in FIG. 4, the 96 receiving units are divided into 3 groups based on their column numbers: the receiving units in columns 0 and 1 are grouped as the first group, the receiving units in columns 2~9 are grouped as the second group, and the receiving units in columns 10 and 11 are grouped as the third group.

Figure 5:
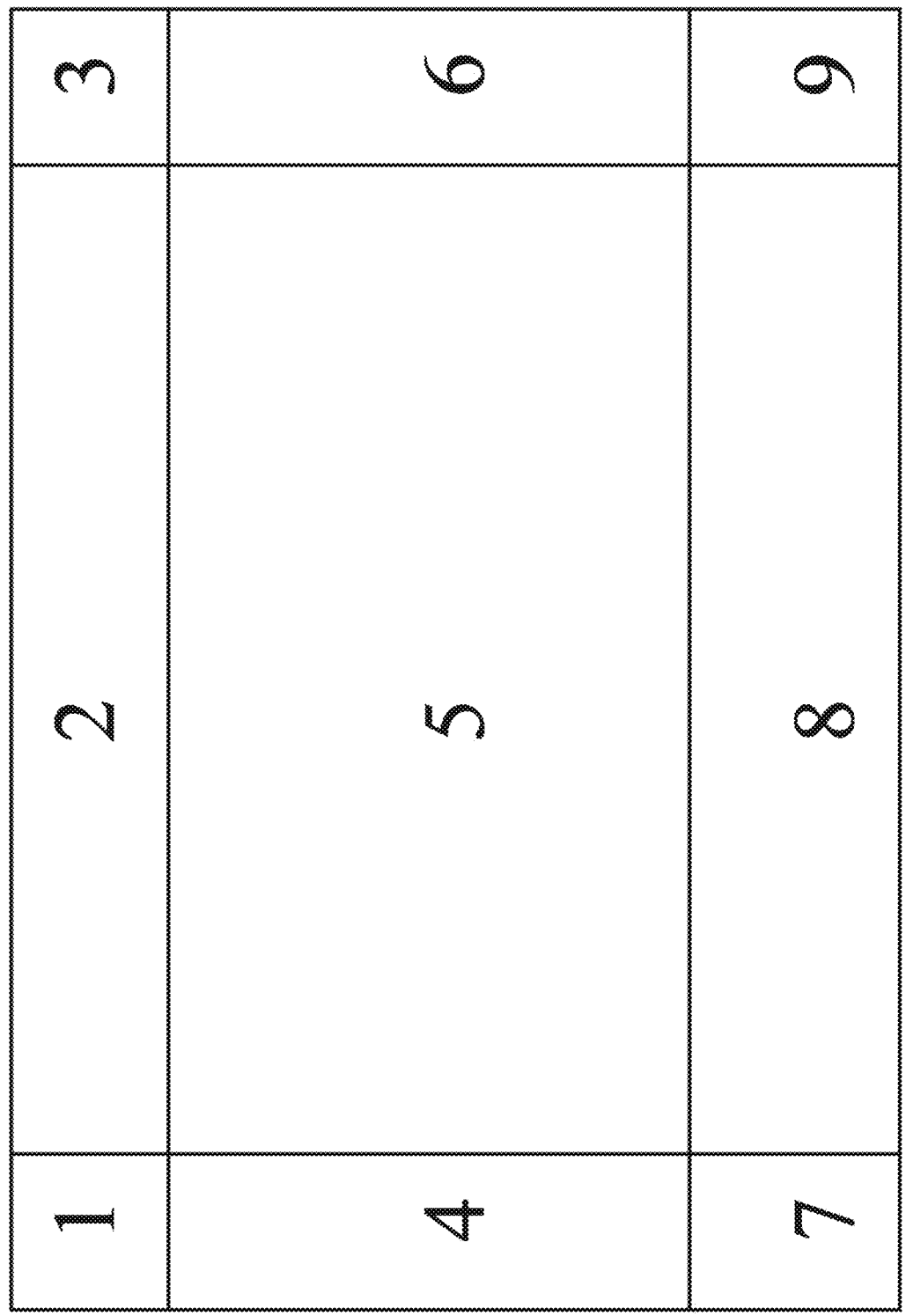
FIG. 5 is another schematic diagram of grouping receiving units provided in an embodiment.

FIG. 5 is another schematic diagram of grouping receiving units provided in an embodiment.

In an embodiment, the receiving units can be grouped according to both row and column numbers. Taking the receiving array shown in FIG. 5 as an example: according to the preset rule, the 96 receiving units in the receiving array can be grouped based on both row and column numbers, as shown in FIG. 5. In the grouping result shown in FIG. 5, the 96 receiving units are divided into 9 groups based on both row and column numbers: the receiving units in rows G and H and columns 0 and 1 are grouped as the first group, the receiving units in rows G and H and columns 2~9 are grouped as the second group, the receiving units in rows G and H and columns 10 and 11 are grouped as the third group, and so on.

In an embodiment, the multiple receiving units can be divided into n groups based on their fields of view according to a preset rule. Here, the field of view of a receiving unit refers to the area illuminated by the laser beam emitted by the corresponding emitting unit.

In an embodiment, the receiving units can be grouped according to their vertical fields of view. The vertical field of view is divided into three parts according to the preset rule: the receiving units corresponding to the vertical field of view range of 0°~30° are grouped as the first group, the receiving units corresponding to the vertical field of view range of 30° ~150° are grouped as the second group, and the receiving units corresponding to the vertical field of view range of 150° ~180° are grouped as the third group. In an embodiment, the vertical field of view range of 0° ~30° corresponds to a field of view inclined towards the ground, the vertical field of view range of 30° ~150° corresponds to a middle field of view, and the vertical field of view range of 150° ~180° corresponds to a field of view inclined towards the sky. The receiving units inclined towards different areas can be grouped, facilitating the setting of different measurement ranges for the receiving units inclined towards different areas. The setting of measurement ranges can be referred to in the subsequent description of step S210.

In an embodiment, the receiving units can be grouped according to their horizontal fields of view. In an embodiment, the horizontal field of view is divided into three parts according to the preset rule: the receiving units corresponding to the horizontal field of view range of 0° ~30° are grouped as the first group, the receiving units corresponding to the horizontal field of view range of 30° ~150° are grouped as the second group, and the receiving units corresponding to the horizontal field of view range of 150° ~180° are grouped as the third group.

In an embodiment, the receiving units can be grouped according to both their vertical and horizontal fields of view. In an embodiment, the vertical and horizontal fields of view are divided into 9 parts according to the preset rule: the receiving units corresponding to the vertical field of view range of 0° ~30° and the horizontal field of view range of 0° ~30° are grouped as the first group, the receiving units corresponding to the vertical field of view range of 0° ~30° and the horizontal field of view range of 30° ~150° are grouped as the second group, the receiving units corresponding to the vertical field of view range of 0° ~30° and the horizontal field of view range of 150° ~180° are grouped as the third group, and so on.

Figure 6:
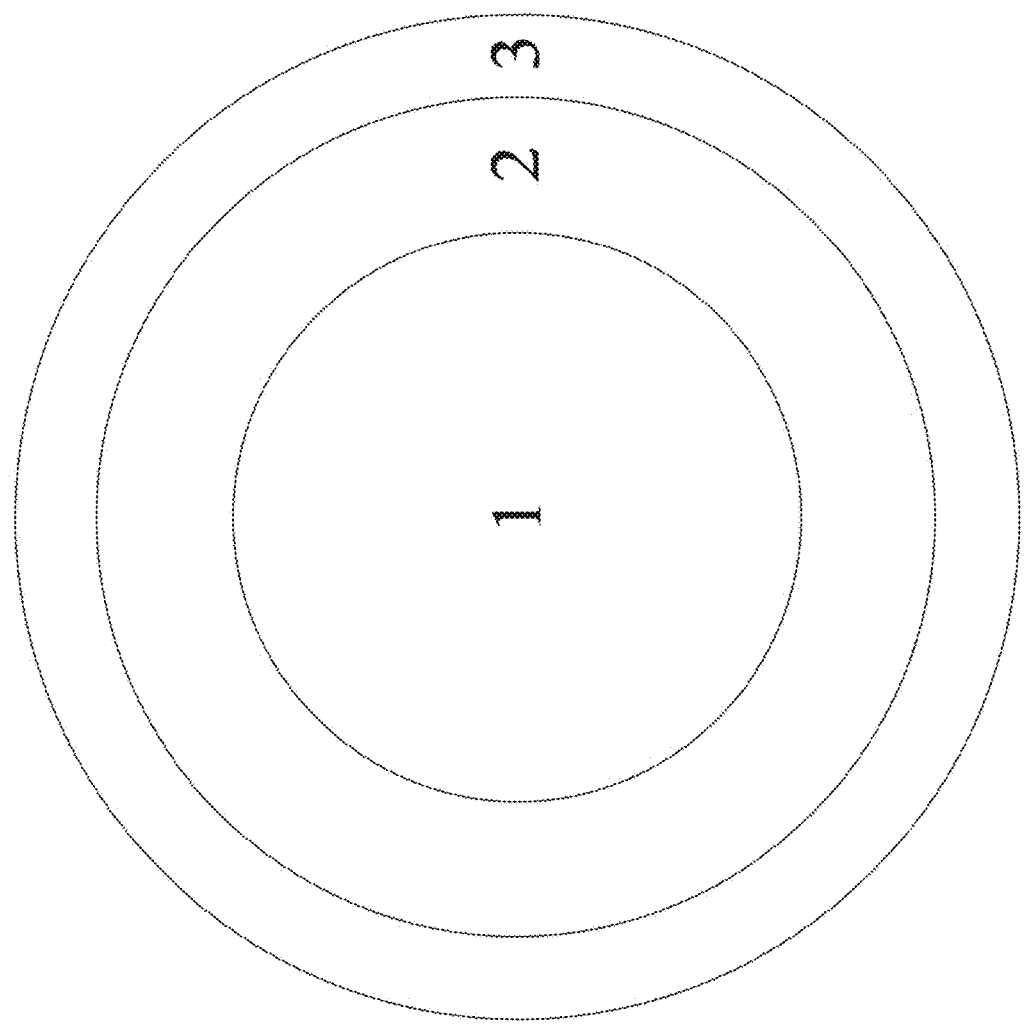
FIG. 6 is yet another schematic diagram of grouping receiving units provided in an embodiment.

FIG. 6 is yet another schematic diagram of grouping receiving units provided in an embodiment.

Embodiments shown in FIGS. 3 to 5 divide the field of view regions into rectangular parts. In an embodiment, the field of view regions can be divided into other shapes, such as annular shapes, as shown in FIG. 6, which is not limited herein.

In an embodiment, the receiving units can be receiving arrays, or they can be receiving line arrays. In an embodiment, the multiple receiving units can be regularly arranged or irregularly arranged, which is not limited herein.

Figure 7:
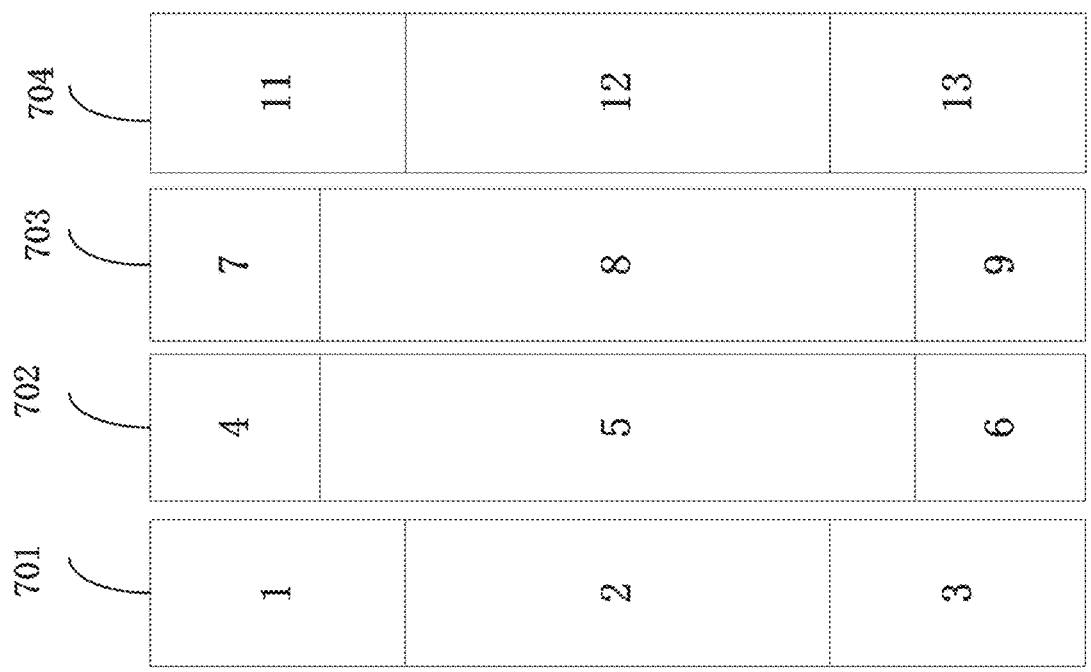
FIG. 7 is a schematic diagram of multiple line arrays provided in an embodiment.

FIG. 7 is a schematic diagram of multiple line arrays provided in an embodiment.

In an embodiment, the receiving units are multiple line arrays, the partition corresponding to the position of the multiple line arrays can be different, or when the receiving units are array arrays, the receiving units in different columns or rows can correspond to different partitions.

In an embodiment, as shown in FIG. 7, FIG. 7 includes four receiving line arrays (receiving line array 701, receiving line array 702, receiving line array 703, receiving line array 704). Each receiving line array is divided into three groups according to the vertical field of view of the receiving units. The receiving line arrays 701 and 704 are located at the edge of the horizontal field of view detection range, a quantity of receiving units in the vertical field of view detection range corresponding to the central partition (such as 2 and 12) can be fewer than the receiving line arrays 702 and 703 located in the central field of the horizontal field of view detection range. In an embodiment, after the receiving arrays are divided into partitions based on the vertical field of view detection range, the partitions can be adjusted according to the horizontal field of view detection range.

By dividing the receiving array into partitions based on the detection range of the vertical field of view or the horizontal field of view, and then adjusting the grouping of the receiving units based on the detection range of the horizontal or vertical field of view, the storage space can be saved while further ensuring the detection requirements.

In an embodiment, as shown in FIG. 3, after the receiving arrays are grouped based on the detection range of the vertical field of view, the grouping of the receiving units can be adjusted based on the detection range of the horizontal field of view of all or part of the area. In an embodiment, as shown in FIG. 4, after the receiving arrays are grouped based on the detection range of the horizontal field of view, the grouping of the receiving units can be adjusted based on the detection range of the vertical field of view of all or part of the area.

Grouping of the receiving arrays based on the detection range of the vertical field of view or the horizontal field of view depends on the system's detection resolution requirements for the horizontal or vertical field of view. In an embodiment, the field of view with higher detection requirements (such as detection distance and/or detection resolution) can be selected to group the receiving arrays first, and then the grouping of the receiving arrays can be adjusted based on the field of view with relatively lower detection requirements.

In an embodiment, part of the receiving units in the receiving arrays are grouped based on the above methods.

S220: Setting a measurement range of the $i^{th}$ group of receiving units, according to a detection requirement corresponding to the $i^{th}$ group of receiving units in the n groups of receiving units.

In an embodiment, after grouping the receiving units in the receiving array into multiple groups, the measurement range or detection resolution can be set according to the detection requirements corresponding to each group of receiving units. In an embodiment, for a field of view area with a smaller required measurement range, a smaller measurement range and lower detection resolution can be set for the receiving units corresponding to that field of view area. In an embodiment, for a field of view area with a larger required measurement range, a larger measurement range and higher detection resolution can be set for the receiving units corresponding to that field of view area.

In an embodiment, referring to grouping according to the vertical field of view, a receiving array is divided into three groups based on the vertical field of view ranges of 0° ~30°, 30° ~150°, and 150° ~180°. In an embodiment, the vertical field of view range of 0° ~30° corresponds to a field of view inclined towards the ground, the vertical field of view range of 30° ~150° corresponds to a middle field of view, and the vertical field of view range of 150° ~180° corresponds to a field of view inclined towards the sky. Since the fields of view inclined towards the ground and the sky have shorter detection distances and lower detection requirements, only a small storage space is needed to store sampling data. The field of view inclined towards the middle has a longer detection distance and higher detection requirements, so a larger storage space is needed to store sampling data.

By setting different measurement ranges and detection resolution requirements for different groups of receiving units according to the detection requirements, unnecessary data measurements can be reduced, and storage space can be saved. In an embodiment, same measurement range is set for all receiving units in the LiDAR receiving array. In order to meet the detection requirements, the measurement range for all receiving units needs to be set relatively large. In this way, for those receiving units that do not need to measure relatively far distances, there will be redundant storage space, leading to a waste of storage space.

S230: Setting storage space of the $i^{th}$ group of receiving units, based on the measurement range of the $i^{th}$ group of receiving units.

In an embodiment, the storage space is used to store the measurement data of the $i^{th}$ group of receiving units, where i is a positive integer, and i∈[1, n]. In an embodiment, the measurement range of the $i^{th}$ group of receiving units is large and the measurement detection requirements are high, a larger storage space can be set for the $i^{th}$ group of receiving units. If the measurement range of the $i^{th}$ group of receiving units is small and the measurement detection requirements are low, a smaller storage space can be set for the $i^{th}$ group of receiving units. The limited storage space can be reasonably allocated, avoiding the situation where some receiving units with fewer data occupy larger storage space, leading to a waste of storage space, and reducing the occurrence of insufficient storage space for some receiving units due to uneven distribution of storage space.

In an embodiment, the measurement range and/or measurement detection requirements for each group of receiving units can be pre-configured according to the known usage of the receiving units in the LiDAR.

In an embodiment, measurement range for each group of receiving units can be adaptively adjusted. In an embodiment, for the $i^{th}$ group of receiving units: obtain the maximum measurement range and/or average measurement range corresponding to the previous frame measurement data of the $i^{th}$ group of receiving units, obtain the historical measurement range corresponding to the historical measurement data of the $i^{th}$ group of receiving units within a preset time range, and then set the measurement range and detection accuracy for the current frame of the $i^{th}$ group of receiving units based on the maximum measurement range and/or average measurement range and historical measurement range.

In an embodiment, obtain the maximum measurement range and/or average measurement range corresponding to the measurement data of the $i^{th}$ group of receiving units within a preset time range, obtain the historical measurement range corresponding to the historical measurement data of the $i^{th}$ group of receiving units, and then set the measurement range and detection accuracy for the current frame of the $i^{th}$ group of receiving units based on the maximum measurement range and/or average measurement range and historical measurement range.

In an embodiment, the preset time range is related to the scanning method of the LiDAR, statistics on the maximum measurement range and/or average measurement range are needed after the detection area corresponding to the $i^{th}$ group of receiving units is detected.

The statistical period can correspond to one detection cycle or a preset quantity of detection cycles. In an embodiment, the preset time can be the time required for the $i^{th}$ group of receiving units to complete detection in one detection cycle. The preset time can be the time required for the $i^{th}$ group of receiving units to complete detection in a preset quantity of detection cycles. A size of the preset time is related to the detection requirements of the $i^{th}$ group of receiving units, the larger the detection distance and higher the detection accuracy requirements of the $i^{th}$ group of receiving units, the shorter the required preset time, further accurately optimizing the storage space of the receiving units with high detection requirements or large detection distances. The smaller the detection distance and lower the detection accuracy requirements of the $i^{th}$ group of receiving units, the longer the required preset time, thereby reducing the number of data statistics cycles for areas with shorter detection distances or lower detection requirements, reducing the computational load of the radar.

In an embodiment, before obtaining the maximum measurement range corresponding to the detection area of the $i^{th}$ group of units, the method includes: obtaining the detection distance value corresponding to each receiving unit in the $i^{th}$ group of receiving units, determining the difference between the detection distance value corresponding to each receiving unit and the detection distance of adjacent receiving units, and if the difference exceeds a first preset value, based on a continuous preset number of times, confirm the difference between the distance value corresponding to each receiving unit and the adjacent receiving unit, and if the difference exceeds the first preset value for the preset number of times, adjust the grouping of the receiving units in that area.

Figure 13:
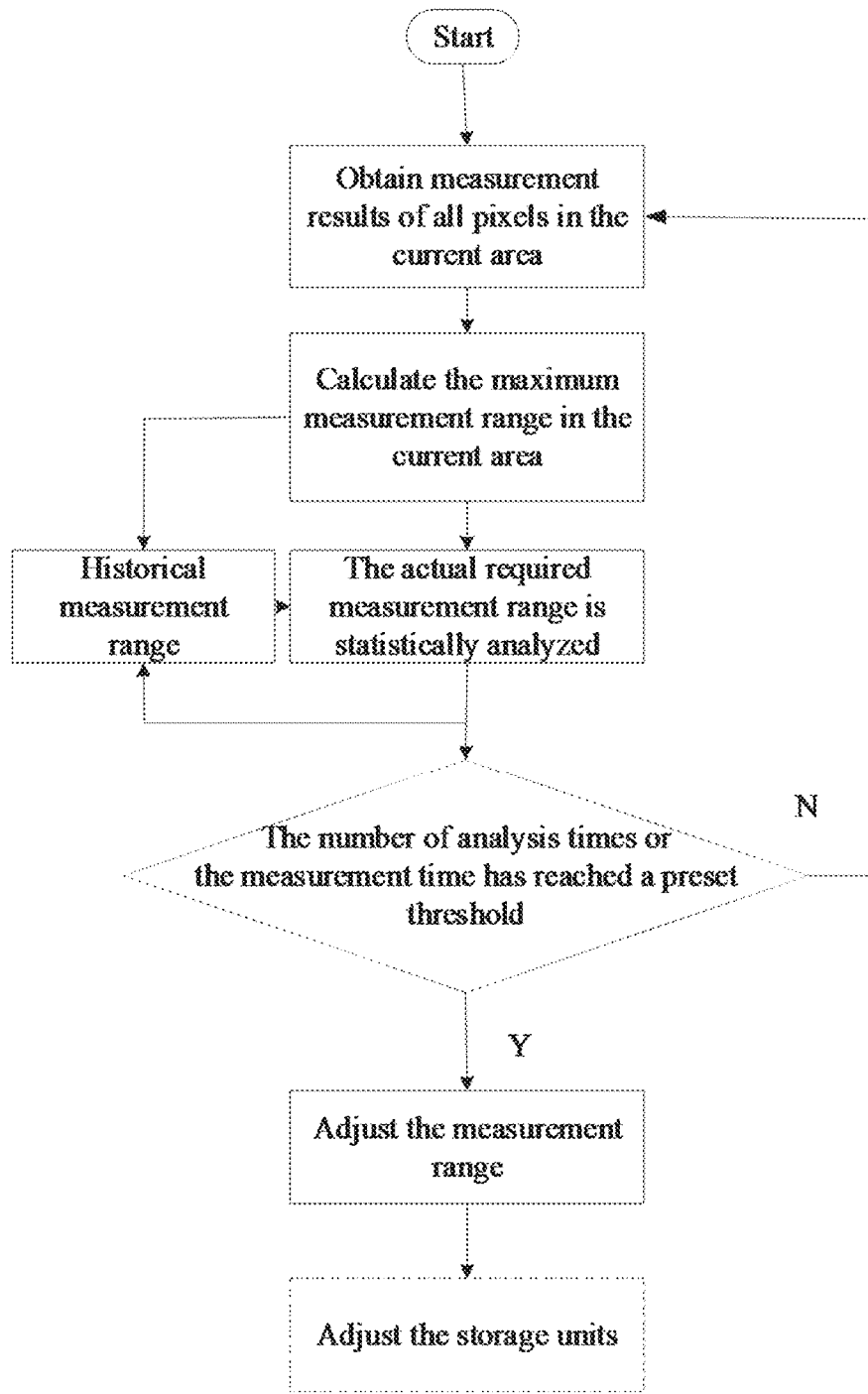
FIG. 13 is a schematic flow chart of adaptively adjusting the measurement range provided in an embodiment.

FIG. 13 is a schematic flow chart of adaptively adjusting the measurement range provided in an embodiment.

In an embodiment, as shown in FIG. 13, measurement results of all pixels in the current area (the area corresponding to the $i^{th}$ group of receiving units) are obtained, and the historical measurement range corresponding to the current area are obtained. The maximum measurement range in the current area is determined based on the measurement results of all pixels, and the actual required measurement range is statistically analyzed based on the maximum measurement range and historical measurement range. In an embodiment, it is determined whether the number of analysis times or the measurement time has reached a preset threshold. If the preset threshold is not reached, the current measurement result is used as historical measurement data for further statistics. If the preset threshold is reached, the data is statistically analyzed, and the required measurement range statistically analyzed is used as the result.

Based on the determined measurement range, the measurement range required for the $i^{th}$ group of receiving units is adjusted. In an embodiment, the storage units corresponding to the $i^{th}$ group of receiving units are adjusted based on the measurement range of the $i^{th}$ group of receiving units.

In an embodiment, based on the measurement range of current measurement data and historical measurement data, the measurement range of the $i^{th}$ group of receiving units is comprehensively determined, so that the measurement range of the $i^{th}$ group of receiving units not only meets the trend of historical measurement data but also meets the requirements of current measurement data, thereby avoiding the situation where the determined measurement range is too small to meet current business requirements or too large, leading to excessive measurement data and occupying excessive storage space.

In an embodiment, a parameter configuration method is provided. This parameter configuration method reduces the amount of measurement data by setting different sampling rates for different measurement distances.

Figure 8:
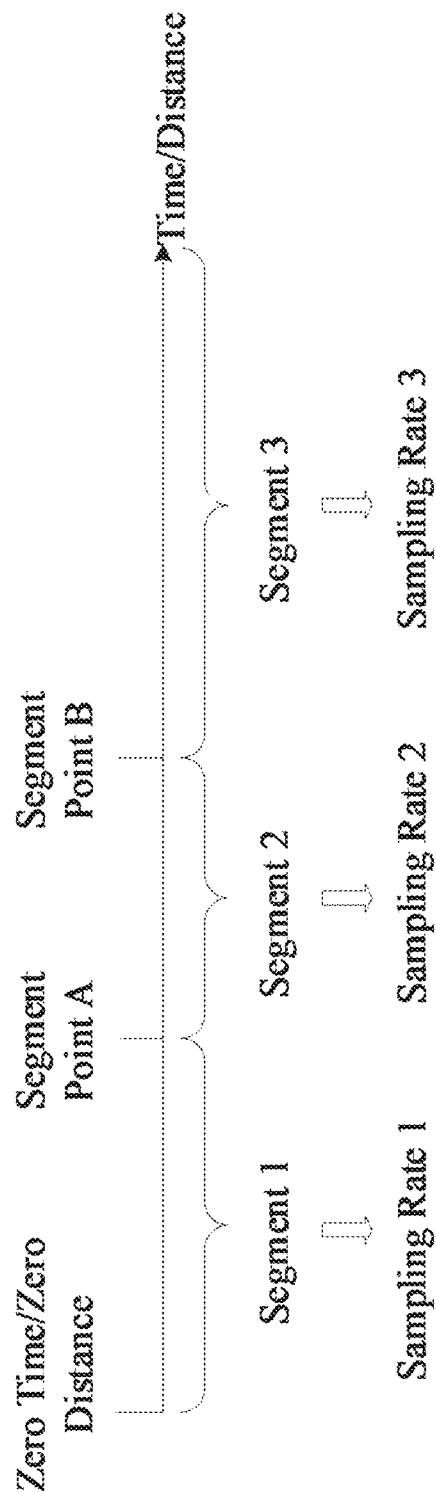
FIG. 8 is a schematic diagram for configuring sampling rates provided in an embodiment.

FIG. 8 is a schematic diagram for configuring sampling rates provided in an embodiment.

In an embodiment, this method includes: setting different sampling rates on different segments in the measurement range, based on the detection requirements corresponding to the $i^{th}$ group of receiving units. In an embodiment, a higher sampling rate is set in the segments with higher accuracy requirements, and a lower sampling rate is set in the segments with lower accuracy requirements. The implementation of this scheme is illustrated in FIG. 8.

In an embodiment, as shown in FIG. 8, segment points (such as segment points A and B) can be set to divide the measurement range or flight time into multiple segments (e.g., segment 1, segment 2, segment 3), and different sampling rates are set for each segment (e.g., segment 1 corresponds to sampling rate 1, segment 2 corresponds to sampling rate 2, segment 3 corresponds to sampling rate 3). The segment points can be set according to the detection requirements. In an embodiment, the measurement detection requirement is relatively high within 0~30 m, the measurement detection requirement is average within 30~60 m, and the measurement detection requirement is relatively low within 60~100 m, so segment points can be set at 30 m and 60 m in the measurement range.

The sampling rate can be reduced in areas with low accuracy requirements, thereby reducing the amount of measurement data.

In an embodiment, different data sampling rates can be used within different flight times, such as setting segment 1 within the range of 0~0.4 microseconds, using a sampling rate of 4 Gsps; setting segment 2 within the range of 0.4~0.8 microseconds, using a sampling rate of 2 Gsps; setting segment 3 within the range of 0.8~1.2 microseconds, using a sampling rate of 1 Gsps. The number of sampled data equals the segment's duration multiplied by the corresponding segment sampling rate. For example, the number of data obtained in segment 1 is 0.4 us*4 Gsps=1600, the number of data obtained in segment 2 is 0.4 us*2 Gsps=800, the number of data obtained in segment 3 is 0.4 us*1 Gsps=400. Thus, the total sampled data in all segments is 1600+800+400=2800. If the same sampling rate is used for all segments within the measurement distance and flight time, for example, if a sampling rate of 4 Gsps is used for each segment, the number of data obtained within the range of 0~1.2 microseconds will be 1.2 us*4 Gsps=4800.

Therefore, in the measurement distance and flight time range, using a combination of high and low sampling rates results in fewer measurement data compared to using a high sampling rate throughout, saving storage space. The combination of high and low sampling rates is beneficial for optimizing the storage space of the LiDAR, saving the storage space of the receiving units.

In an embodiment, a parameter configuration method is provided. This parameter configuration method reduces the amount of measurement data by setting different data rates for different measurement distances.

In an embodiment, this method includes: screening the measurement data of the $i^{th}$ group of receiving units according to the detection situation of the $i^{th}$ group of receiving units. In an embodiment, in segments with high accuracy requirements, data is not screened, or a large amount of data is screened; in segments with low accuracy requirements, less data is screened. The implementation of this scheme is illustrated in FIGS. 9 and 10.

Figure 9:
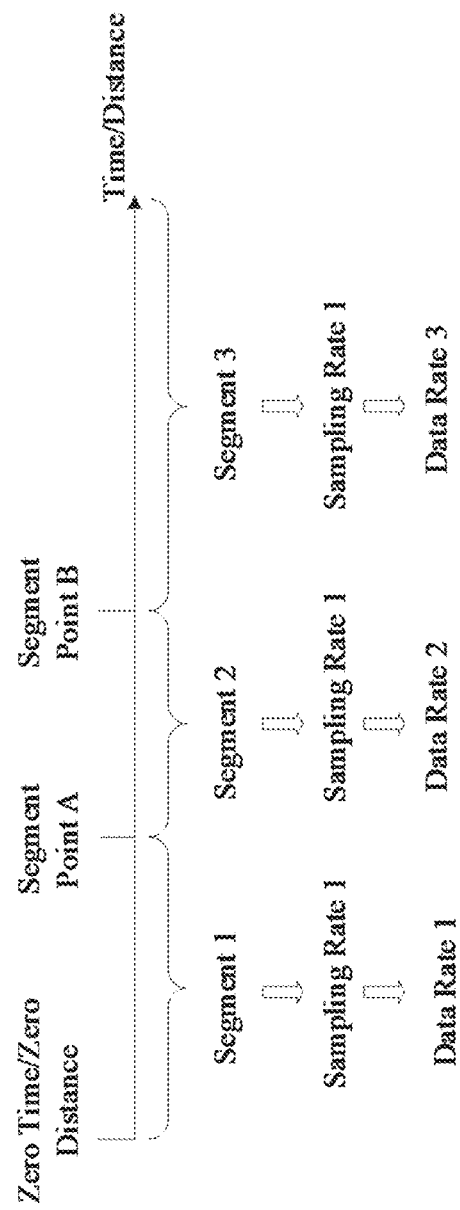
FIG. 9 is a schematic diagram for configuring data rates provided in an embodiment.
Figure 10:
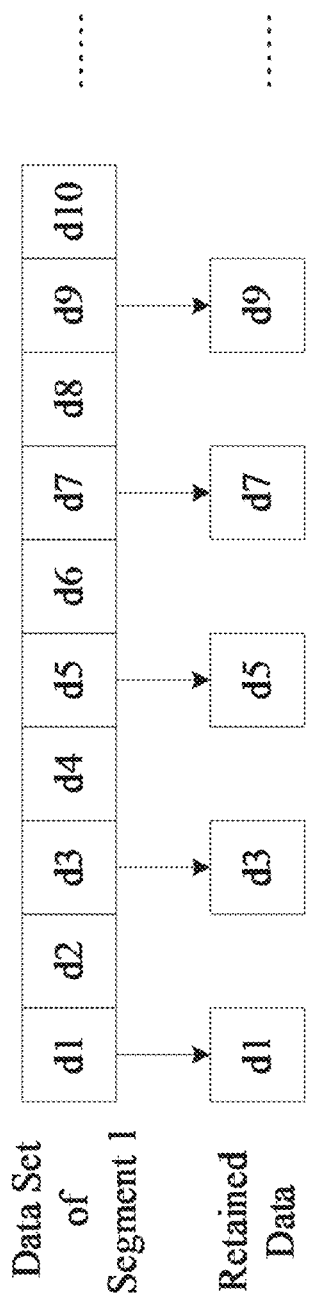
FIG. 10 is a schematic diagram for screening measurement data provided in an embodiment.

FIG. 9 is a schematic diagram for configuring data rates provided in an embodiment. FIG. 10 is a schematic diagram for screening measurement data provided in an embodiment.

In an embodiment, as shown in FIG. 9, segment points (such as segment points A and B) can be set to divide the measurement range or flight time into multiple segments (e.g., segment 1, segment 2, segment 3), and the same sampling rate is set for each segment (e.g., segments 1, 2, and 3 all correspond to sampling rate 1). Different data rates are set for each segment. The data rate here can be understood as the proportion of data retained after screening, for example, a data rate of 70% means that 30 out of 100 data points are deleted, and 70 data points are retained. Referring to FIG. 10, assuming the data rate for the data set collected in segment 1 is 50%, 50% of the data needs to be screened. In the example shown in FIG. 10, every other data point is retained by deleting every second data point, i.e., for d1 and d2, retain d1 and delete d2; and for d3 and d4, retain d3 and delete d4, and so on.

The same sampling rate is used for each segment, and the sampled data is used as the screened measurement data. Thus, part of the data in all segments is extracted and screened, reducing the storage space occupied by all the data and optimizing the storage space.

In an embodiment, different sampling rates can be used for each segment, and the detection data can be obtained based on different sampling rates. In an embodiment, segment points (such as segment points A and B) can be set to divide the measurement range or flight time into multiple segments (e.g., segment 1, segment 2, segment 3), and different sampling rates are set for each segment (e.g., segments 1, 2, and 3 correspond to sampling rates 1, 2, and 3, respectively). Then, detection data is obtained based on different sampling rates.

Different sampling rates are used for each segment, saving storage space occupied by all data and optimizing the storage space.

Corresponding to the methods provided in the embodiments of this application, the embodiments of this application also provide corresponding devices. The devices include modules for performing the corresponding methods in each embodiment. The modules can be software, hardware, or a combination of software and hardware. The technical features described in the method embodiments are also applicable to the device embodiments.

Figure 11:
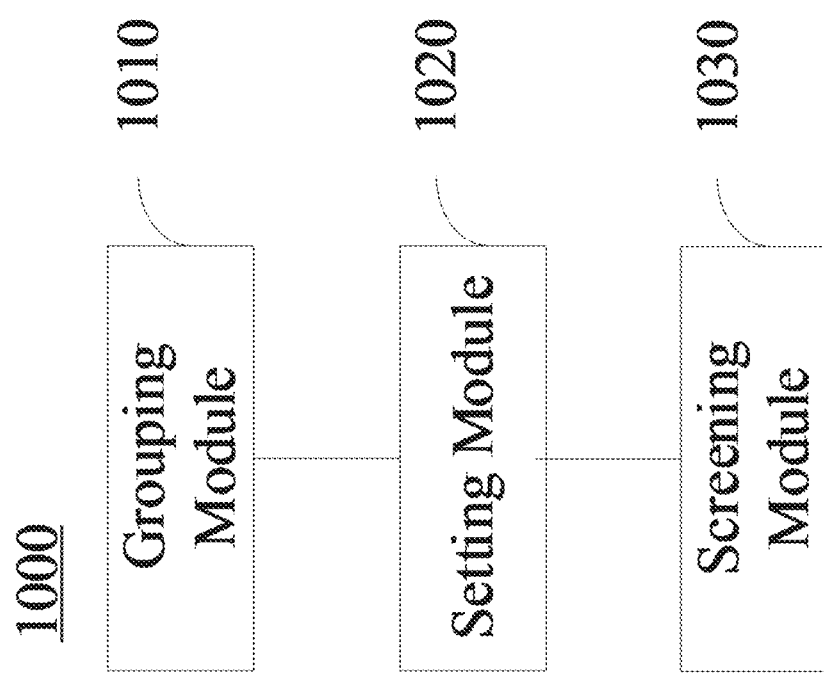
FIG. 11 is a structural schematic diagram of a parameter configuration device provided in an embodiment.

FIG. 11 is a structural schematic diagram of a parameter configuration device provided in an embodiment.

FIG. 11 shows a structural block diagram of the device 1000 provided in the embodiments of this application. Referring to FIG. 11, the device includes the following modules:

grouping module 1010, used to divide a plurality of receiving units in the receiving array of the LiDAR into n groups of receiving units according to a preset rule, where each group of receiving units includes at least one receiving unit, and n is a positive integer greater than or equal to 1;

setting module 1020, used to set the measurement range of the $i^{th}$ group of receiving units according to the detection requirement corresponding to the $i^{th}$ group of receiving units in the n groups of receiving units, where i is a positive integer, and i is in a range of [1, n];

the setting module 1020 is used to set the storage space of the $i^{th}$ group of receiving units based on the measurement range of the $i^{th}$ group of receiving units, where the storage space is used to store measurement data of the $i^{th}$ group of receiving units.

In an embodiment, the grouping module 1010 is used to divide the plurality of receiving units into n groups based on their fields of view according to the preset rule.

In an embodiment, the grouping module 1010 is used to divide the plurality of receiving units into n groups based on their row numbers and/or column numbers according to the preset rule.

In an embodiment, the setting module 1020 is used to obtain the maximum measurement range of the current measurement data of the $i^{th}$ group of receiving units and the historical measurement range corresponding to the historical measurement data. Based on the maximum measurement range and the historical measurement range, the measurement range of the $i^{th}$ group of receiving units is set.

In an embodiment, the setting module 1020 is used to set different sampling rates on different segments within the measurement range based on the detection requirements corresponding to the $i^{th}$ group of receiving units.

In an embodiment, the device includes a screening module 1030, used to screen the measurement data of the $i^{th}$ group of receiving units according to the detection situation of the $i^{th}$ group of receiving units.

The information interaction, execution process, and other contents between the above-mentioned devices/units, due to being based on the same concept as the method embodiments of this application, have functions and bring about technical effects that can be referred to in the method and system embodiments section.

The above functional units and modules are described as examples. The functions described above can be distributed among different functional units or modules as needed, the internal structure of the device can be divided into different functional units or modules to complete all or part of the functions described above. The functional units and modules in the embodiments can be integrated into one processing unit, or they can be physically separate units. They can also be integrated into one unit with two or more units. The integrated units can be implemented in hardware form, or in software functional units. The names of the functional units and modules are for convenience in distinguishing them. The working process of the units and modules in the above-mentioned system can be referred to in the corresponding process in the method embodiments described earlier.

Figure 12:
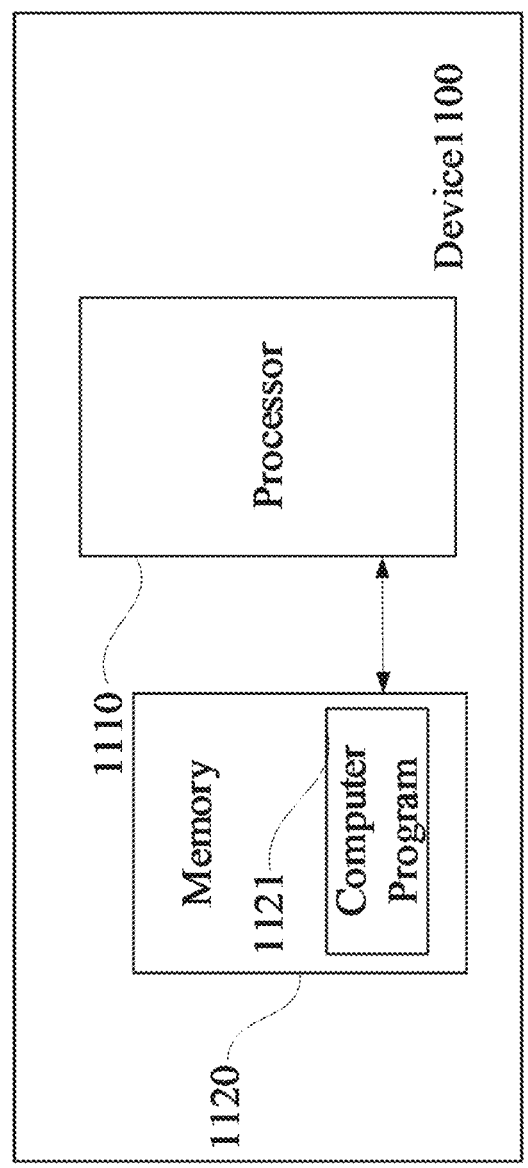
FIG. 12 is another structural schematic diagram of a parameter configuration device provided in an embodiment.

FIG. 12 is another structural schematic diagram of a parameter configuration device provided in an embodiment.

As shown in FIG. 12, an embodiment of this application also provides a device 1100. The device 1100 includes: at least one processor 1110, a memory 1120, and a computer program 1121 stored in the memory and operable on the at least one processor. When the processor executes the computer program, the steps of any of the method embodiments.

An embodiment of this application also provides a computer-readable storage medium. The computer-readable storage medium stores a computer program, which, when executed by a processor, implements the steps of any of the method embodiments.

An embodiment of this application provides a computer program product. When the computer program product is run on an electronic device, it causes a mobile terminal to implement the steps of any of the method embodiments.

If the integrated units are implemented as software functional units and sold or used as standalone products, they can be stored in a computer-readable storage medium. Based on this understanding, all or part of the processes in the methods of the embodiments described above can be implemented by instructing related hardware via a computer program. The computer program can be stored in a computer-readable storage medium, and when executed by a processor, the steps of any of the method embodiments described above are implemented. The computer program includes computer program code, which can be in the form of source code, object code, executable files, or some intermediate form. The computer-readable medium can include any entity or device capable of carrying the computer program code, such as a recording medium, a computer memory, a read-only memory (ROM), a random access memory (RAM), an electric carrier signal, an electrical signal, and a software distribution medium, for example, a USB flash drive, a mobile hard disk, a magnetic disk, or an optical disk. In some jurisdictions, according to legislative and patent practices, a computer-readable medium cannot be an electric carrier signal or an electrical signal.

Various exemplary units and algorithm steps described in the embodiments disclosed herein can be implemented in electronic hardware, computer software, or a combination of both. Whether these functions are executed in hardware or software depends on the specific application and design constraints.

In the embodiments provided by this application, the disclosed devices, network equipment, and methods can be implemented in other ways. For example, the devices or network equipment described above are merely illustrative. For instance, the division of modules or units is only one logical functional division. In actual implementation, there can be other divisions. For example, multiple units or components can be combined or integrated into another system, or some features can be omitted or not executed. Another point is that the coupling or direct coupling or communication connection between the displayed or discussed units or modules can be through some interfaces, devices, or unit indirect coupling or communication connections, which can be electrical, mechanical, or other forms.

What is claimed is:

1. A parameter configuration method for saving storage space of a LiDAR, comprising:

determining, by a processor, a detection resolution requirement of a horizontal detection field of view and a vertical detection field of view of a plurality of receiving units in a receiving array of the LiDAR; wherein the receiving units comprise avalanche photodiodes, single-photon avalanche diodes, or silicon photomultipliers, and the receiving units are configured to acquire measurement data; wherein the field of view of a receiving unit refers to the area illuminated by the laser beam emitted by the corresponding emitting unit;

wherein the horizontal detection field of view of receiving units comprises the edge field of view and the central field of view, the vertical detection field of view of receiving units comprises a field of view inclined towards the ground, a middle field of view, and a field of view inclined towards the sky, when the detection resolution requirement of the horizontal detection field of view is high, grouping, by the processor, the plurality of receiving units according to a field of view range of the horizontal detection field of view, and adjusting, by the processor, grouping of the plurality of receiving units according to a field of view range of the vertical detection field of view, to obtain n groups of receiving units, wherein each of the n groups of receiving units comprises at least one receiving unit, and n is a positive integer greater than or equal to 1; or when the detection resolution requirement of the vertical detection field of view is high, grouping, by the processor, the plurality of receiving units according to a field of view range of the vertical detection field of view, and adjusting, by the processor, grouping of the plurality of receiving units according to a field of view range of the horizontal detection field of view, to obtain n groups of receiving units;

setting, by the processor, a measurement range of an $i^{th}$ group of receiving units, according to a detection requirement corresponding to the $i^{th}$ group of receiving units in the n groups of receiving units, wherein i is a positive integer within a range of [1, n], and the measurement range corresponds to a detection distance range; and setting, by the processor, storage space of the $i^{th}$ group of receiving units according to the measurement range of the $i^{th}$ group of receiving units, wherein the storage space is used to store measurement data of the $i^{th}$ group of receiving units;

wherein setting, by the processor, storage space of the $i^{th}$ group of receiving units according to the measurement range of the $i^{th}$ group of receiving units comprises:

in response to the measurement range of the $i^{th}$ group of receiving units being large and the detection requirements being high, increasing, by the processor, the storage space of the $i^{th}$ group of receiving units; or in response to the measurement range of the $i^{th}$ group of receiving units being small and the detection requirements being low, decreasing, by the processor, the storage space of the $i^{th}$ group of receiving units.

2. The method according to claim 1, wherein the setting the measurement range of the $i^{th}$ group of receiving units, according to the detection requirement corresponding to the $i^{th}$ group of receiving units in the n groups of receiving units comprises:

obtaining, by the processor, a maximum measurement range corresponding to current measurement data of the $i^{th}$ group of receiving units, and a historical measurement range corresponding to historical measurement data; and setting, by the processor, the measurement range of the $i^{th}$ group of receiving units according to the maximum measurement range and the historical measurement range.

3. The method according to claim 1, further comprising: setting, by the processor, a sampling rate of the $i^{th}$ group of receiving units on different segments in the measurement range, according to the detection requirement corresponding to the $i^{th}$ group of receiving units.

4. The method according to claim 1, further comprising: selecting, by the processor, the measurement data of the $i^{th}$ group of receiving units, according to a detection situation of the $i^{th}$ group of receiving units.

5. A parameter configuration device, comprising a processor and a memory, wherein the memory stores a computer program, and the computer program is configured to be loaded by the processor to perform the steps according to claim 1.

6. A non-transitory computer-readable storage medium, wherein the non-transitory computer-readable storage medium stores a computer program, and when the computer program is executed by a processor, the steps of the parameter configuration method according to claim 1 is implemented.

\* \* \* \* \*